(12) United States Patent
Millar

(10) Patent No.: US 8,857,895 B2
(45) Date of Patent: Oct. 14, 2014

(54) TIBIA FORCE REDUCTION WEDGE

(71) Applicant: David J. Millar, St. Charles, MO (US)

(72) Inventor: David J. Millar, St. Charles, MO (US)

( * ) Notice: Subject to any disclaimer, the term of this patent is extended or adjusted under 35 U.S.C. 154(b) by 0 days.

(21) Appl. No.: 13/907,434

(22) Filed: May 31, 2013

(65) Prior Publication Data

US 2013/0257096 A1 Oct. 3, 2013

Related U.S. Application Data

(63) Continuation-in-part of application No. 13/523,972, filed on Jun. 15, 2012, now abandoned.

(60) Provisional application No. 61/660,706, filed on Jun. 16, 2012, provisional application No. 61/498,300, filed on Jun. 17, 2011.

(51) Int. Cl.
  *B60N 99/00* (2006.01)
  *B60N 3/06* (2006.01)
  *B60R 21/12* (2006.01)
  *B60R 21/04* (2006.01)
  *B60R 21/00* (2006.01)
  *B60R 21/02* (2006.01)

(52) U.S. Cl.
  CPC ......... *B60N 3/066* (2013.01); *B60R 2021/0046* (2013.01); *B60R 2021/0293* (2013.01); *B60R 21/12* (2013.01); *B60R 21/04* (2013.01); *B60R 21/02* (2013.01)

USPC .......................... 296/187.05; 296/75; 280/751

(58) Field of Classification Search
  CPC ................................. B60R 21/02; B60N 3/06
  USPC ................... 296/187.05, 187.08, 75; 280/751
  See application file for complete search history.

(56) References Cited

U.S. PATENT DOCUMENTS

| | | | |
|---|---|---|---|
| 6,241,301 B1 * | 6/2001 | Speth et al. .................... 296/75 |
| 7,017,978 B2 * | 3/2006 | Murakami et al. ........ 296/187.05 |
| 7,246,837 B2 * | 7/2007 | Dendo et al. .................... 296/75 |
| 7,900,994 B2 * | 3/2011 | Takakura et al. ........ 296/187.05 |
| 7,946,641 B2 * | 5/2011 | Ohtsubo et al. ................. 296/75 |
| 7,967,358 B2 * | 6/2011 | Shukuri et al. .................. 296/75 |
| 2003/0222478 A1 * | 12/2003 | Akasaka et al. ......... 296/187.05 |
| 2005/0104414 A1 * | 5/2005 | Murakami et al. ....... 296/187.05 |
| 2007/0080562 A1 * | 4/2007 | Taniguchi et al. ....... 296/187.05 |

\* cited by examiner

*Primary Examiner* — Lori Lyjak
(74) *Attorney, Agent, or Firm* — Charles McCloskey

(57) ABSTRACT

A tibia force reduction wedge has a core, a coating upon the core, and fasteners upon the coating. The core has three surfaces forming a triangularly shaped cross section and two opposite spaced apart ends. The core has single or dual density closed cell energy absorbing expanded polyethylene. Following skiving upon the surfaces, the coating adheres to the exterior of the core. The invention has an anti fungal, non slip, polyurethane coating. Hook and loop fasteners mutually engage fasteners upon an existing surface of a vehicle deck for adjustment to the leg lengths of vehicle occupants. The wedge sees usage beneath seats inside a vehicle.

20 Claims, 3 Drawing Sheets

TIBIA FORCE REDUCTION WEDGE

CROSS-REFERENCE TO RELATED APPLICATION

This non-provisional application claims priority to the provisional application 61/654,853 filed on Jun. 2, 2012 and is a continuation in part of the pending non-provisional application Ser. No. 13/523,972 filed on Jun. 15, 2012 which claims priority to provisional application 61/498,300 filed on Jun. 17, 2011, all of which are owned by the same inventor.

BACKGROUND OF THE INVENTION

The tibia force reduction wedge relates generally to reduction and prevention of injuries inflicted upon occupants in vehicles from improvised explosive device, or IED, and mine blast events, and more specifically to the reduction of tibia, fibula, foot, and ankle injuries. A person, civilian or military, can readily install the invention. A person with little or no comprehension of English can also install the invention.

From before the Revolutionary War, the military developed mines and used explosives. Mines began as containers of gunpowder concealed upon a battlefield and triggered by release of various mechanical actuators like trip wires. Military explosives started as full gunpowder containers triggered with fuses or rifle rounds. From those beginnings in this country mines and military explosives have evolved, proliferated, and developed in other countries. Present day mines serve two purposes: anti-tank and anti-personnel. Such mines have abbreviations as AT mines and AP mines. AP mines generally remain small in size, readily and quickly concealed, and designed to maim the limbs of a soldier. Such limbs include the leg with its femur bone in the upper leg and the fibula and tibia bones in the lower leg. AT mines generally have additional explosive compared to an AP mine and may include warheads so that the AT mine can disable a track of an armored vehicle or penetrate the hull of an armored vehicle.

In the last decade, military action in Iraq and Afghanistan has seen the rise of improvised explosive devices, or IED. These devices generally have a home made construction of explosives and placement in atypical locations such as in walls three feet above the ground, in peasant carts, on persons, and the like. IED have posed an asymmetric threat to US and allied force and civilians it the Iraqi and Afghani theatres of operations.

To mitigate the IED threat, military forces have increased their force protection efforts. These efforts have placed more soldiers in armored vehicles, even for routine tasks, such as mail delivery, than in prior military conflicts. However, the enemy has recognized this and adapted the IED to more potent models. The US has also responded with new vehicles such as a Mine-Resistant Ambush Protected vehicle or MRAP, the Buffalo, and reinforcements to older vehicles such as an M1AI Abrams main battle tank, a M113 Armored Personnel Carrier or APC, Bradley Infantry Fighting Vehicle, Fox chemical detection vehicle, and the like, upon the existing interior surface of the vehicle. Such vehicles withstand IED however, occupants of the vehicles still endure the effects of the blast.

Though this application mentions military and solider, the Applicant utilizes those terms in a broad sense to represent all military services and to include select heavy civilian applications such as mining and quarrying. Though this application mentions vehicle, the Applicant utilizes those terms in a broad sense to represent military and civilian vehicles, armored and unarmored vehicles, and wheeled vehicles and tracked vehicles, among other things.

DESCRIPTION OF THE PRIOR ART

Traditionally, manufacturers have provided armor upon vehicles to resist rounds from another armored vehicle. Tanks have armor to withstand engagement from other tanks and more recently from missiles. Tracked personnel carriers have armor to resist small arms fire and up to fifty-cal machine gun rounds usually from ground troops or other armored vehicles. Because of the weight of armor, wheeled vehicles have lacked armor beyond light plates as small arms protection.

As described above, the prevalence of IED in recent operational theatres has stimulated additional armor placement in more vehicles than before. Currently, most armored vehicles use floor mats that provide limited protection from floor accelerations that result in high foot, ankle, fibula, and tibia loads. During a blast, the hull of a vehicle deflects extremely fast and the movement of the hull at those speeds injures the occupants before they even realize the blast has occurred. These high loads then break bones and inflict soft tissue injuries upon occupants of the vehicles during blast events.

The present invention reduces and in some events prevents lower leg injuries to the foot, ankle, fibula, and tibia of occupants in a vehicle during a blast event.

SUMMARY OF THE INVENTION

Generally, the present invention provides a wedge like piece the compresses and partially collapses during a blast event. The wedge has a core, a coating upon the core, and fasteners upon the coating. The core has three surfaces forming a triangularly shaped cross section and two opposite spaced apart ends. The tibia force reduction wedge of the invention has a typical application as a padded wedges placed inside a vehicle, such as an Mine-Resistant Ambush Protected vehicle or MRAP, a M113 Armored Personnel Carrier or APC, Fox, and the like, upon the existing interior surface of the vehicle. The wedge in the invention has single or dual density closed cell energy absorbing expanded polyethylene, or "EPP," foam wedges. These EPP wedges of the invention have an anti fungal, non slip, polyurethane coating upon their exterior and hook and loop fasteners. These hook and loop fasteners mutually engage hook and loop fasteners adhered to an existing surface of a vehicle deck which allows for adjustment to the leg lengths of various occupants. The wedges of the present invention may be cut, molded, extruded, and the like, in various sizes and angled to fit the intended application. The wedges of the present invention may have a unitary form or be assembled from multiple sections.

This invention reduces the injuries suffered by occupants as it provides a padded surface that orients an occupant's foot, ankle, and tibia to proper angles and maintains them at the angles so as to reduce loads applied to the foot, ankle, and tibia during a blast event. The wedges and the material of their construction compress and partially collapse under blast forces, thus attenuating the forces and reducing the risk of injury to a foot placed upon the wedge. The wedges of the invention may see application by themselves or in combination with an existing floor mat.

The Applicant has considered expanded polyethylene, or EPE, and expanded polypropylene, or EPP, as suitable materials to attenuate impact and withstand the elements and biological decay. During testing, the EPP exhibited difficulties with cost and lack of ability to support adhesion upon its surface. The Applicant has solved the lack of adhesion through this invention. The Applicant has removed the low coefficient of friction skin formed upon the surface of an EPP object during its manufacture. The manufacturing of a wedge molds and expands polypropylene beads, or pellets, into a piece. However the surface of the piece develops a skin with a smooth exterior because the beads melt and acquire the surface characteristics of the mold, generally smooth. The present invention has skived the surface of a wedge and thus exposed approximately 50% of the crystalline structure of individual cells of polypropylene in the piece. Skiving shaves, or imparts, cuts to the surface of the piece making that exposure of the cells. With this cell exposure, the Applicant found a coating that replaces the skin of a wedge yet allows for other items to adhere, or bond to, the coating applied upon a wedge.

There has thus been outlined, rather broadly, the more important features of the invention in order that the detailed description thereof that follows may be better understood and that the present contribution to the art may be better appreciated. The present invention also includes a core that has increased energy absorption properties over the existing surfaces while keeping the proper orientation of the foot, ankle, fibula, and tibia of an occupant to reduce the forces transmitted to the lower legs of the occupant and reduce or prevent injuries to them, coating additives for coloration, grip, and microbial resistance, variations in EPP density, and elongation of the coating during an impact event. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved tibia force reduction wedge that compresses and partially collapses during a blast event.

One object of the present invention is to provide a tibia force reduction wedge that decreases impact forces upon a person or part of a person by up to a factor of four from a blast event.

Another object is to provide such a tibia force reduction wedge that can be easily and readily installed by civilians with little to no skill, military personnel of all ranks, and foreign nationals with little if any comprehension of English.

Another object is to provide such a tibia force reduction wedge that resists degradation from fire, water, chlorine, ultraviolet light, bacteria, microbes, fungi, and saltwater.

Another object is to provide such a tibia force reduction wedge that attaches to existing vehicles, military vehicles, and armored vehicles.

Another object is to provide such a tibia force reduction wedge that adjusts to the leg lengths of occupants of existing vehicles, military vehicles, and armored vehicles.

Another object is to provide such a tibia force reduction wedge that has various thicknesses and angles to provide the proper level of protection in higher risk areas traversed by existing vehicles, military vehicles, and armored vehicles.

Another object is to provide such a tibia force reduction wedge that can be easily and efficiently manufactured and marketed to government departments and agencies and select civilian applications.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

The present invention overcomes the prior art limitations by providing a tibia force reduction wedge that installs upon a floor or a deck in a vehicle. The invention will be better understood from a reading of the following detailed description of the preferred embodiment and alternate embodiments of the invention in conjunction with the figures in which the sizes and distances between various elements does not represent actual sizes or distances between various elements.

Figure 1A:
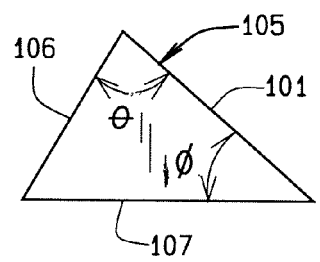
FIG. 1a shows an end view of the invention.

FIG. 1a provides an end view of the invention of a wedge 101. This wedge attains its shape from a triangular cross section shown in FIG. 1. The wedge has a front surface 105, a back surface 106 forming an included interior angle with the front surface as at $\Theta$, or first internal angle, and a bottom 107 spanning from the front surface to the back surface across the included interior angle, akin to a hypotenuse. The wedge has two ends, as at 108, generally shown as triangular in this figure.

The wedge 101 of the present invention operates as a system of a plurality of wedges for use in armored vehicles, or other vehicles, to prevent and to reduce lower leg injuries. The present invention may see use in any armored vehicle. The wedge of the present invention reduces the floor acceleration forces transmitted to the foot, ankle, fibula, and tibia of a vehicle occupant as later shown in FIGS. 5a, 5b. The wedge installs and cleans readily. The present invention may see use in any area of a vehicle, equipment or a structure that requires impact energy management.

Applied inside vehicles, the wedge has key properties of foot to floor angles of about 20° to about 60°, cell structure, recovery rates and stiffness, and coating components and processes suitable to blast mitigation. The foot to floor angle follows an interior angle, or second internal angle, attained by the front surface 105 relative to the bottom 107 as at ϕ. The second internal angle, as at ϕ, ranges from about 20° to about 60° with a preference of 45°. The junction of the front surface to the bottom is also called the heel. The cell structure of the wedge is single density EPP foam or alternatively dual density EPP foam depending upon the specific application, that is, vehicle. The wedges utilize foam with properties tailored towards impact attenuation. The foam in the invention's wedges has a density in the range of about 20 g/l to about 200 g/l, and specific cell structure, recovery rate, and stiffness that dissipate the energy of an impact upon the wedge. The wedges allow flexibility in their length, width, and height to fit various vehicles and field conditions provided the second internal angle remains within the about 20° to about 60° range. The wedge also attaches to hook and loop fasteners, as at 104a shown in FIG. 6, installed upon existing vehicle decking or flooring.

Figure 1B:
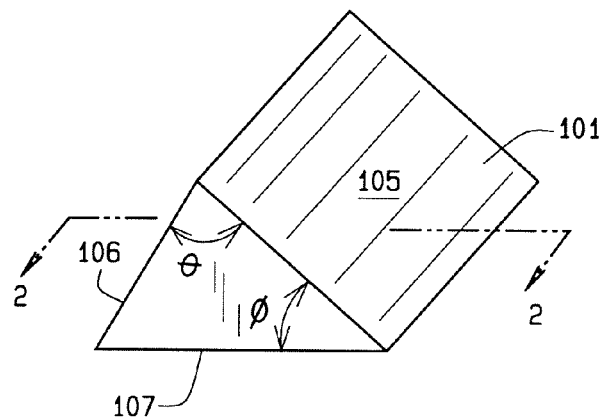
FIG. 1b shows a perspective view of the invention.

Turning the invention, FIG. 1b shows a perspective view of the wedge 101 with the front surface 105 generally upward and visible. One end 108 is shown in the foreground. During usage, a soldier rests his boots upon the front surface, also shown in FIG. 4b.

Figure 2:
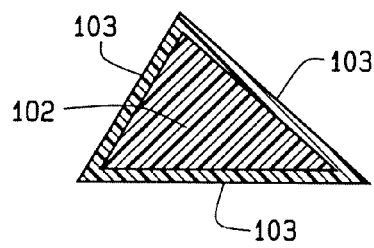
FIG. 2 shows a sectional view of the invention.

FIG. 2 has a sectional view through the invention that shows the coating 103 of polyurethane upon the exterior of the wedge and the EPP foam 102 defining the interior of the wedge. The wedge of the invention has three parts. First, a polyurethane antifungal, non-slip, non-skid, fire resistant coating, as at 103 that protects all exterior surfaces of the wedge. Second, a closed cell high energy absorbing foam that also absorbs impact as at 102. And, third, hook and loop fastener as at 104 shown in FIG. 3 that attaches the wedges to cooperating hook and loop fasteners 104a on the existing vehicle deck or floor as in FIG. 6.

The coating 103 includes from about six to about nine components that allow a mechanical bond of the coating to the EPP substrate following skiving. The coating has the following properties: less than 3% shrinkage, tensile strength in excess of 2000 psi, an elongation of 300%, a high coefficient of friction from about 0.7 to about 1.3, a shore hardness in excess of 75 A, an operating temperature range of about −40° F. to about 210° F., and a lack of support for biological activity. The coating has a burn rating of 0.0" following FAA testing of approximately 1600° F. for approximately 15 seconds. The coating prevents warping of individual pieces and its elongation allows the coating and the substrate to attenuate impact forces during usage. The coating also permits inclusion of other components such as tinting agents, matting agents, traction additives, such as sand, vinyl flatteners, and fibers for cut resistance, particularly para-aramid synthetic fiber, such as poly-paraphenylene terephthalamide or Kevlar®, and additives that impart resistance to ultraviolet light. The traction additive, or agent, imparts to the coating a coefficient of friction from about 0.7 to about 1.30 that reduces or lessens impact injuries by reducing the probability of slips and falls upon the invention when installed. Generally the traction additive is placed upon the front surface 105 upon which a soldier rests his boots. These other additives impart durability and slip resistance to a piece for various applications.

Preferably, the coating includes Scorpion X02-ZBG Biocidal Polyurethane made by Custom Concept Coatings of Belleville, Ontario, Canada. This polyurethane coating has three components: part A, part B, and part C. Part A has 1,1'-methylenebis(4-isocyanatocyclohexane), or $C_{15}H_{22}N_2O_2$, from Tokyo Chemical Industrial, Ltd. of Japan, and 2-n-Octyl-4-isothianzolin-3-one, or $C_{11}H_{19}NOS$, from Dalian Haoyuan Jinghua Science & Tech. Development Co., Ltd. of Yantai, China. Part B has proprietary miscellaneous zinc compounds and n-butyl acetate, or $C_6H_{12}O_2$, from Celanese Corp. of Oberhausen, Hoechst, Germany. Part C provides a catalyst containing at least one acrylic polymer, at least one residual monomer, and water. The preferred embodiment has these components mixed in ratios suitable to achieve the intended goals. The mixture has generally about 2 to about 3 parts A, about 0.5 to about 1.5 parts B, about 0.5 to about 1.5 parts C. For coloration and traction, the mixture includes about ⅛ to about ⅙ parts tint and about 1 part traction additive. The preferred embodiment of the coating for the invention has the exact proportions of 2.5 parts A, 1 part B, 1 part C, ⅐ parts tint, and 1 part traction additive. Preferably, the formulation of the invention follows these steps: blending part B into to part A, then adding part C to the blend of part B and part A, and then adding various additives as desired into the blend of part C into part B and part A. The preceding general and precise, preferred and alternate, mixtures undergo mechanical mixing for about 1.5 minutes to about 3.5 minutes, preferably 3 minutes. The mixing preferably occurs from about 55° F. to about 100° F. at a relative humidity of 5 percentage points less than the air temperature. The mixtures may be applied as a coating upon the EPP core using a high volume, low pressure, or HVLP, spray gun, brush, roller, or trowel within 20 minutes.

As desired by the end user, the coating attains a gloss finish without any flattener, a semi-gloss finish with 0.5 parts flattener, and a matte finish with 1 part flattener. For enhanced durability, the mixture of the invention includes 1 part Kevlar fibers. Alternatively, construction of the invention may laminate Kevlar fabric upon the surface of the EPP core and integral with the coating.

The second part, the foam core, then is within the coating of the invention and has the form of an EPP core. EPP has various properties and a few well suited for this invention. The Applicant has tested various formulations of EPP in pursuit of a proper strain rate and density for a blast and impact resistance. Devices that seek to attenuate impact forces undergo testing according to ASTM F1292, Standard Specification for Impact Attenuation of Surfacing Materials within the Use Zone of Playground Equipment, incorporated by reference. The Standard determines whether a material attenuates impact forces. A material that meets the Standard has these properties: a Gmax less than 200, a HIC less than 1000, densities from about 1.9 to about 3.7 pcf, strain rates between about 0.1 to about 0.4 MPa. At these densities, the EPP material works well for applications in temperatures from about −22° F. to about 212° F. as blast mitigating material. For applications at colder temperatures, EPE has a density between about 2.3 to about 4.2 pcf, strain rates between about 0.1 to about 0.4 MPa, and an operating temperature range of about −76° F. to about 160° F. The coating, preferably a select polyurethane, increased the operating temperature range an additional 20° F. to about 180° F. The EPP of the invention's core also meets military specifications.

Though a wedge of close cell foam is shown and described above, the Applicant also foresees a hollow wedge, a hollow tube of sufficient diameter to attain the range of second internal angle in cooperation with a typical boot sole, or a cylinder of sufficient diameter in cooperation with a flat planar member that also attains the range of second internal angle in place of the front surface 105 of the solid wedge.

Figure 3:
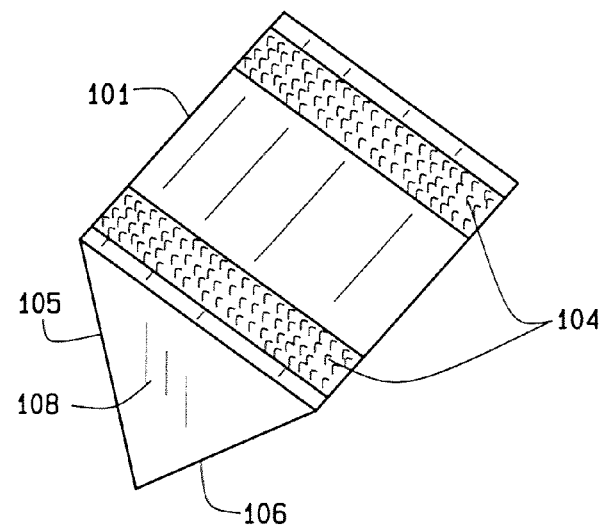
FIG. 3 describes a perspective view of the invention, bottom visible.

Turning the wedge, FIG. 3 provides a perspective view of the wedge 101 rotating the bottom 105 up from FIG. 1b. The bottom has at least one strip of hook and loop fastener as at 104 though two strips are preferred and shown. In the preferred embodiment, the strips are hook fastener so that only loop fastener is placed upon a vehicle. With loop fastener on the vehicle and hook fastener on the wedge, the hook fasteners avoid damage in comparison to the loop fasteners subject to the hazards of personnel and cargo moving inside the vehicle. The strips 104 attach to their cooperating counterparts previously installed upon a floor or deck of a vehicle. Mechanics and others in the field will apply loop fastener to the floor or deck after removing the release layer provided with the fastener. Though this description refers to hook and loop fastener, the Applicant also foresees securing the wedge using adhesives, cooperating snaps and buttons, and magnets.

Figure 4A:
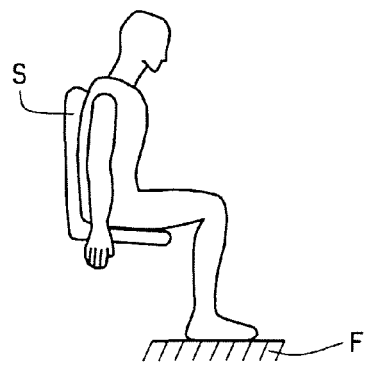
FIG. 4a illustrates a side view of an occupant in a vehicle and FIG. 4b shows a side view of an occupant in a vehicle using the invention.
Figure 4B:
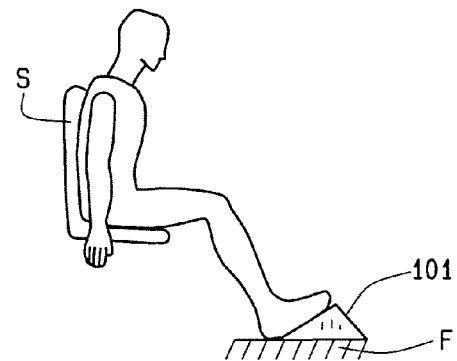

FIG. 4a shows an occupant from the side in a seat S in an existing vehicle. The occupant has his feet flat upon the deck, or floor F, typical to vehicle occupants at present. With feet flat upon the floor, the lower legs of the occupant are generally perpendicular to the floor. FIG. 4b then shows an occupant from the side, still seated in an existing vehicle but with his feet upon the invention 101, particularly the front surface 105 and his lower leg at an acute angle to the floor. With feet upon the invention 101 as in FIG. 4b, the occupant has reduced leg motion, reduced energy transmission, and reduced injuries to the foot, ankle, fibular and tibia. The present invention's wedge 101 places the occupant's feet at an angle to the floor of about 20° to about 60° as at $\phi$, preferably 45°. The occupant then moves his leg to a complementary, and comfortable, angle to that of his feet upon the invention.

Figure 5A:
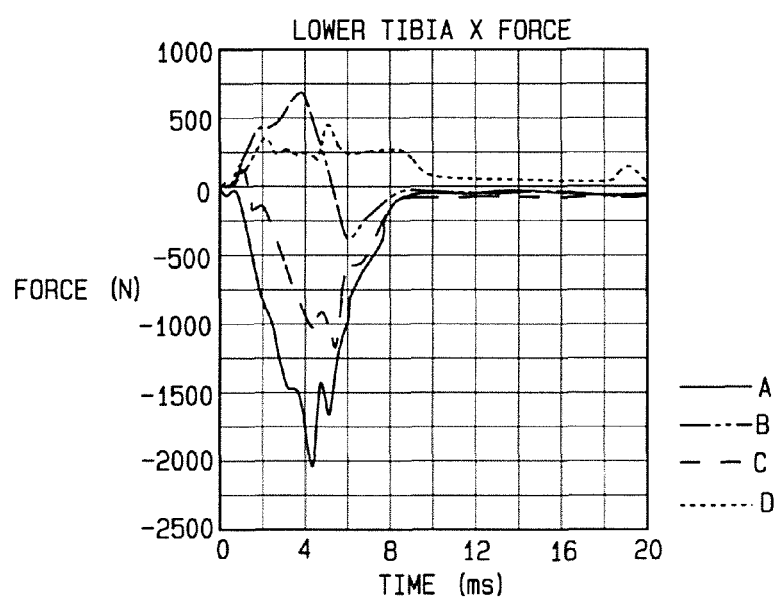
FIG. 5a provides a chart of the tibia force reduction X force of a foot as shown in FIG. 4b and FIG. 5b provides a chart of the tibia force reduction Z force of a foot as shown in FIG. 4b; and, FIG. 6 is a top sectional view of a vehicle showing placement of the invention therein.
Figure 5B:
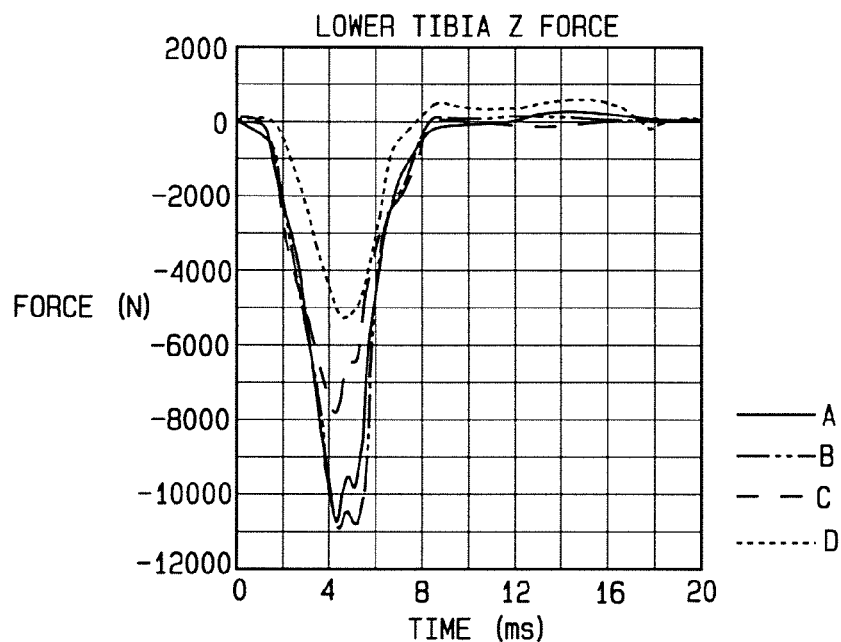

FIGS. 5a, 5b show the reduction in force, measured in Newtons, applied to the lower tibia of an occupant by maintaining a proper foot to floor angle as shown in FIG. 4b. FIG. 5a shows the force reduction upon the X axis of the tibia from the foot position A in FIG. 4a to the foot position D shown in FIG. 4b. More dramatically, FIG. 5b shows a 5500 N lower tibia force reduction upon the Z axis of the tibia from the foot position A in FIG. 4a to the foot position D shown in FIG. 4b during a high load case, that is, a blast event, where 85 mm of floor travel occurs in 6 ms.

Figure 6:
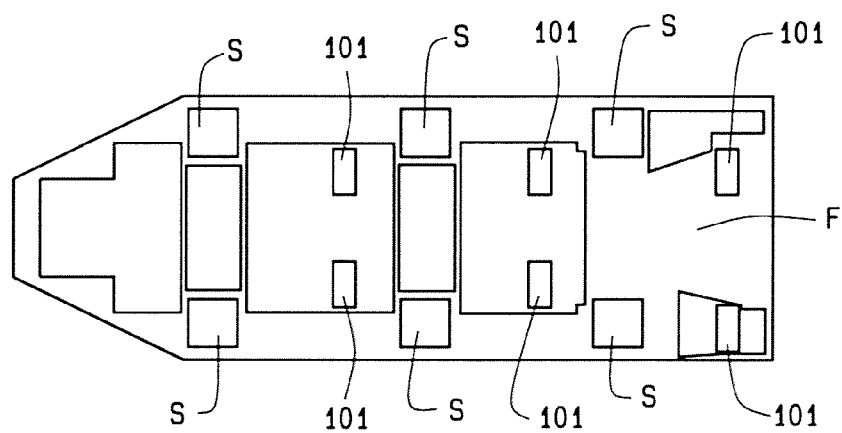

FIG. 6 shows placement of the invention 101 at select locations in a typical existing armored vehicle, that is, the recommended use. The armored vehicle has various seats S upon a floor F. The invention can also be placed in suitable locations in other vehicles.

The preceding description and figures often referred to a vehicle. The references to a vehicle, its decking and its floor serve as examples because the invention installs upon other vehicles, machinery, and equipment utilized by an occupant or operator. Such vehicles and equipment include without limitation trucks, jeeps, HUMVEES, construction vehicles such as bulldozers, other walk behind power equipment, ride upon power equipment, snowmobiles, personal watercraft, select boats, select aircraft, boats, mobile machinery, logging equipment both powered and not powered, mining equipment both powered and not powered, construction equipment whether powered or not, and the like.

From the aforementioned description, a tibia force reduction wedge has been described. The tibia force reduction wedge is uniquely capable of placing an occupants feet within a select angular range to the floor and reduce or even prevent injuries to the lower legs of occupants. The tibia force reduction wedge and its various components may be manufactured from many materials, including but not limited to, EPP, polymers, polyvinyl chloride, high density polyethylene, polypropylene, closed cell foam, open cell foam, nylon, select metals, their alloys, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device to reduce lower leg injuries of occupants in a vehicle, comprising:
    a core having three surfaces forming a triangular cross section and two ends mutually parallel and spaced apart, said ends generally perpendicular to said three surfaces, said core being elongated and prismatic;
    a coating upon said core, said coating covering said three surfaces and said ends;
    at least one releasable fastener secured to one of said three surfaces wherein said at least one releasable fastener is adapted to secure to the vehicle.

2. The injury reducing device of claim 1 further comprising:
    said three surfaces including a front surface, a back surface, and a bottom;
    said front surface and said back surface intersecting at a first internal angle $\theta$;
    said front surface and said bottom intersecting at a second internal angle $\phi$ away from said first internal angle; and, wherein said bottom is adapted to adjoin a floor of the vehicle and said first internal angle is adapted to be away from the floor of the vehicle.

3. The injury reducing device of claim 2 further comprising:
said second internal angle φ having the range of about 20° to about 60°.

4. The injury reducing device of claim 2 wherein said second internal angle φ is 45°.

5. The injury reducing device of claim 1 further comprising:
said core being expanded polypropylene.

6. The injury reducing device of claim 1 wherein said coating elongates proportionally to said core.

7. The impact injury reducing device of claim 1 further comprising:
said coating including a Part A, a Part B, and, a Part C;
wherein Part A is 1,1'-methylenebis (4-isocyanatocyclohexane) and 2-n-Octyl-4-isothianzolin-3-one;
wherein Part B is at least one zinc compound and n-butyl acetate; and,
wherein Part C is a catalyst, said catalyst including one of at least one acrylic polymer, at least one residual monomer, and water.

8. The injury reducing formulation of claim 7 further comprising:
about 2 to about 3 parts Part A;
about 0.5 to about 1.5 parts Part B; and,
about 0.5 to about 1.5 parts Part C.

9. The injury reducing device of claim 2 further comprising:
said at least one releasable fastener being upon said bottom.

10. The injury reducing device of claim 9 wherein said at least one releasable fastener is one of hook fastener and loop fastener.

11. The injury reducing device of claim 10 wherein said at least one releasable fastener is hook fastener.

12. The injury reducing device of claim 2 wherein said coating applies traction additive upon said front surface.

13. The injury reducing device of claim 1 wherein said device reduces forces applied to an occupant by at least 5500 Newtons.

14. A blast effect reducing device in a vehicle occupied by persons, comprising:
a compressible, collapsible core, a coating covering said core, said core having two opposite ends and begin elongated;
at least one releasable fastener secured to said core wherein said at least one releasable fastener is adapted to secure to the vehicle;
wherein said core has a height adapted to cooperate with a foot of a person so that the foot attains an angle φ having the range of about 20° to about 60°; and,
wherein said device reduces forces applied to an occupant by at least 5500 Newtons.

15. The injury reducing device of claim 14 further comprising:
said core being expanded polypropylene; and,
said coating elongating proportionally to said core.

16. The injury reducing device of claim 14 further comprising:
said coating including about 2 to about 3 parts Part A;
about 0.5 to about 1.5 parts Part B;
about 0.5 to about 1.5 parts Part C;
wherein Part A is 1,1'-methylenebis (4-isocyanatocyclohexane) and 2-n-Octyl-4-isothianzolin-3-one;
wherein Part B is at least one zinc compound and n-butyl acetate; and,
wherein Part C is a catalyst, said catalyst including one of at least one acrylic polymer, at least one residual monomer, and water.

17. The injury reducing formulation of claim 15 wherein said core is a hollow wedge.

18. The injury reducing formulation of claim 15 wherein said core is a wedge shape having three surfaces forming a triangular cross section and two ends mutually parallel and spaced apart, said ends generally perpendicular to said three surfaces, said core being elongated and prismatic;
said three surfaces including a front surface, a back surface, and a bottom;
said front surface and said bottom intersecting at a second internal angle φ away from said first internal angle; and,
wherein said bottom is adapted to adjoin a floor of the vehicle.

19. A device to reduce lower leg injuries of occupants in a vehicle, comprising:
an expanded polypropylene core having a front surface, a back surface, and a bottom cooperatively forming a triangular cross section and two ends mutually parallel and spaced apart, said ends generally perpendicular to said three surfaces, said core being elongated and prismatic;
a coating upon said core, said coating covering said three surfaces and said ends and elongating proportionally to said core;
at least one releasable fastener secured to one of said three surfaces wherein said at least one releasable fastener is adapted to secure to the vehicle;
said front surface and said back surface intersecting at a first internal angle θ;
said front surface and said bottom intersecting at a second internal angle φ away from said first internal angle, said second internal angle φ having the range of about 20° to about 60°;
said coating including about 2 to about 3 parts Part A; about 0.5 to about 1.5 parts Part B; about 0.5 to about 1.5 parts Part C;
wherein Part A is 1,1'-methylenebis (4-isocyanatocyclohexane) and 2-n-Octyl-4-isothianzolin-3-one; wherein Part B is at least one zinc compound and n-butyl acetate; wherein Part C is a catalyst, said catalyst including one of at least one acrylic polymer, at least one residual monomer, and water;
said at least one releasable fastener being upon said bottom and wherein said bottom is adapted to adjoin a floor of the vehicle and said first internal angle is adapted to be away from the floor of the vehicle; and,
wherein said device reduces forces applied to an occupant by at least 5500 Newtons.

20. The injury reducing device of claim 19 further comprising:
said second internal angle φ being 45°;
said at least one releasable fastener is hook fastener; and,
said coating having traction additive upon said front surface.

* * * * *